United States Patent [19]

Chang et al.

[11] Patent Number: 5,192,576
[45] Date of Patent: Mar. 9, 1993

[54] THICK-THIN RETORT STARCH

[75] Inventors: Shau-Gan Chang, Chicago, Ill.; Linda L. Charlton, Wheatfield, Ind.; Jane D. Gottneid, Griffith, Ind.; Ibrahim R. Abbas, Munster, Ind.

[73] Assignee: American Maize-Products Company, Stamford, Conn.

[21] Appl. No.: 775,219

[22] Filed: Oct. 11, 1991

[51] Int. Cl.$^5$ .......................................... A23L 1/0522
[52] U.S. Cl. ................... 426/578; 426/579; 426/589; 426/661; 127/32; 127/33; 127/71; 536/105; 536/111
[58] Field of Search ............... 426/578, 579, 589, 661; 127/32, 33, 71; 536/105, 111

[56] References Cited

U.S. PATENT DOCUMENTS

| | | | |
|---|---|---|---|
| 3,748,151 | 7/1973 | Szymanski | 426/578 |
| 3,904,601 | 9/1975 | Tessler | 426/578 |
| 3,959,514 | 5/1976 | Eastman | 426/589 |
| 4,038,482 | 7/1977 | Eastman | 426/578 |
| 4,452,978 | 6/1984 | Eastman | 536/111 |

OTHER PUBLICATIONS

Von M. Palasinski and F. Schierbaum, "Die Selbsthydrolyse der Kartoffelstärke", Die Stärke 23. Jahrg. 1971/Nr. 11, pp. 383–390.

L. Larsen, "Bleaching—Hypochlorite Stage", Handbook of Pulp and Paper Technology, 2nd Ed., pp. 264–274.

Primary Examiner—Jeanette Hunter
Attorney, Agent, or Firm—Lucas & Just

[57] ABSTRACT

The thick-thin retort starch is an oxidized, hydroxy alkylated starch. The base starch is either a waxy or a root starch. The degree of substitution is up to 0.93 and the etherification agent is ethylene oxide or propylene oxide. The oxidation step is conducted after the etherification. Oxidation is accomplished with sodium or calcium hypochlorite at a pH of 4 to 5. A non-substituted, oxidized waxy or root starch also has thick-thin properties.

20 Claims, No Drawings

THICK-THIN RETORT STARCH

This invention relates to a modified food starch for use in retort food processing. The modified food starch produces a paste with a high or thick viscosity before retort, and a low or thin viscosity after retort.

Retort food processing, often associated with a canning process, is one in which a foodstuff is placed into a container and the container is sealed and subjected to a high temperature sufficient to commercially sterilize the contents of the container. Prior to filling the container, the foodstuff is generally subjected to a cooking step.

In order to get each container with a uniform mix, canners often meter each individual ingredient into the can. Another method employed is to first blend all the ingredients together and then add the blended foodstuff to the container.

Where the foodstuffs are mixed prior to their addition to the container, it is important to maintain the uniformity of the mix throughout the mixing and filling steps. Due to the rheological properties of starch pastes, a starch paste is often employed to suspend and maintain the uniformity of the mix. In order for the starch paste to be acceptable for retort food processing, the paste must provide a high or thick viscosity during mixing and filling to maintain the uniformity of the mix and a low or thin viscosity during retort to allow good heat penetration for sterilization of the foodstuff.

Starches which provide a thick viscosity during the cooking and canning process and break down to a thin viscosity during retort are referred to as thick-thin retort starches.

Potato starch is used as a thick-thin retort starch because of its natural tendency to break down, or self-hydrolyze. See Die Starke 23 Jahrg 1971/Nrll, pp. 383-390. A problem associated with potato starch is that it lacks stability during the extended cooking and filling processes. Potato starch pastes also have a tendency to add haze to the finished product.

U.S. Pat. No. 3,748,151 issued Jul. 24, 1973 teaches that a mix of a starch and a mono- or dicarboxylic acid such as ascorbic acid can be used as a thick-thin starch.

Also, U.S. Pat. Nos. 3,959,514 issued May 25, 1976 and 4,038,482 issued Jul. 26, 1977 teach acetylated root and root-type starches as thick-thin retort starches. These patents teach that the acetylated starch can be oxidized either before or after esterification to toughen or slightly inhibit the starch and increase its hot paste viscosity. In one specific example, Example III of each patent, potato starch is oxidized with sodium hypochlorite at a pH of 7.0–7.3. The acetylated starches can be mixed with other starches such as hydroxypropylated, epichlorohydrin crosslinked waxy maize starch derivatives where it is not essential that the starch paste be water-thin after retort.

It has now been discovered that a thick-thin retort starch can be made from waxy and root starches through a carefully controlled oxidation process wherein the pH is maintained between about 3.5 and about 5.0 and only hypochlorite is used. The thick-thin retort starch of the present invention has a high processing viscosity and good stability throughout the cooking and filling process. Upon retort, the starch breaks down to a thin viscosity. The retorted starch paste has excellent clarity and storage stability even under adverse conditions, such as repeated freezing and thawing.

The thick-thin retort starch of the present invention is an oxidized hydroxy alkyl starch ether wherein the starch is selected from the group consisting of waxy starches and root starches and has a degree of substitution up to about 0.93 by hydroxy alkyl groups. The starch is oxidized by a hypochlorite solution at a pH between about 3.5 and about 5.0 wherein the available chlorine in solution is between about 0.05% and about 3.5% by weight of starch to obtain an oxidized hydroxy alkylated starch having a hot paste viscosity of about 4000 cps to about 6000 cps. This hot paste viscosity is measured at 20 rpm using a Model RVF-100 Brookfield viscometer at a temperature of about 90° C. using an aqueous starch paste of 5.5% by weight starch which was cooked on a steam table of 95° C. for 15 minutes.

It is critical that the pH be maintained at between about 3.5 and about 5.0 during the oxidation process. More preferably, the pH is maintained at about 4 to about 5. Maintaining the pH throughout the oxidation step requires the pH to be continuously monitored and, if the pH waivers outside the critical range, to add either an acid or base to bring the pH back into the critical range. It has been found that at a pH below about 4, i.e. 3.5 to 4, the thick-thin retort starch of the present invention, although having the appropriate thick-thin viscosity characteristics, has a chlorine flavor which is not desirable for use in foods. If the pH goes above about 5 during oxidation, then there is insufficient breakdown of the starch during retort.

Suitably, the acids used to lower the pH in accordance with the present invention are hydrochloric acid, sulfuric acid and phosphoric acid. Hydrochloric acid is the preferred acid. Suitable bases include sodium hydroxide, potassium hydroxide and calcium hydroxide. Sodium hydroxide is the preferred base. The pH is suitably monitored using conventional equipment which has been properly calibrated. The hypochlorite solution used in accordance with this invention is either sodium or calcium hypochlorite; sodium is preferred. The amount of hypochlorite solution used is measured as the percent of available or active chlorine by weight of starch. This is a conventional measurement which is made in a conventional manner. The amount of available chlorine in accordance with the present invention is about 0.08% to about 3.5%. More preferably, the available chlorine is about 0.1% to about 1.0%. Good results have been obtained with about 0.2% to about 0.6% available chlorine. Best results are obtained at 0.4% available chlorine.

The base starch of the present invention is selected from the group consisting of waxy starches and root starches. Waxy starches are the preferred base starch. Suitable waxy starches include waxy maize, waxy rice, waxy milo and waxy sorghum. Suitable root starches include potato, sweet potato, yams, cassava (tapioca) taro and arrow root. Good results have been obtained with a waxy maize starch.

The etherification reaction is preferably done first and the oxidation reaction done second. The degree of substitution is up to 0.93 and more preferably is about 0.04 to about 0.13. Good results have been obtained with a degree of substitution of about 0.06 to about 0.09. The starch ether used to make the present invention is made in a conventional manner with conventional equipment. For example, a slurry of base starch is prepared having about 5% to about 40% by weight starch. The pH of the slurry is adjusted to about 10 to about 12, preferably with sodium hydroxide. Next, the etherification agent is added. Suitable etherification agents include ethylene oxide and propylene oxide; propylene oxide is preferred. The amount of etherification agent added is about 0.5% to about 25% by weight starch. More preferably about 5% to about 15% by weight starch of the etherification agent is added. Good results have been obtained when about 6% to about 10% by weight starch of etherification agent is added. The etherification reaction is conducted for about 5 to about 30 hours at about 70° F. (20° C.) to about 120° F. (50° C.). An acid is added to the slurry to stop the reaction. The preferred starch ether is hydroxypropylated waxy corn starch.

In order to oxidize the starch ether, an aqueous slurry is prepared at about 5% to about 40% by weight starch. The slurry is heated to about 90° F. (30° C.) to about 130° F. (55° C.) and, more preferably, about 105° F. (40° C.) to about 110° F. (45° C.). The slurry is then maintained at that temperature while the hypochlorite solution is added. The pH is then adjusted and maintained in the critical range until the desired viscosity is obtained. The reaction time is about 0.5 to about 5.0 hours. The desired viscosity is a hot paste viscosity of about 4000 cps to about 6000 cps. The reaction is then deactivated, preferably by the addition of sodium metabisulfite. The resulting oxidized starch is then washed and dried in a conventional manner.

More preferably, the pH is adjusted and maintained in the slurry immediately prior to the addition of the hypochlorite solution. It has been found that, if the pH is adjusted prior to the addition of the hypochlorite solution, the thick-thin retort starch provides nearly water-thin viscosity after retort. If the pH is adjusted after the addition of the hypochlorite solution, then some residual viscosity remains after retort.

It has been found that the pH-controlled oxidation of starch by a hypochlorite solution produces a starch which has a paste viscosity greater than the starch itself. This is surprising and unexpected because oxidized starches normally have a lower viscosity than the original paste. As noted above, it is critical that a hypochlorite solution be used to oxidize the starch. Other oxidation agents such as sodium chlorite and hydrogen peroxide have not produced the starch of the present invention.

It has also been found that the step of etherification can be eliminated and that the unmodified base starch subjected to the same pH controlled oxidation process as the etherified starch is suitable as a thick-thin starch. Such a thick-thin starch is non-substituted and subjected only to the pH-controlled oxidation process. Such a thick-thin retort starch is characterized as being a non-substituted, oxidized starch wherein the base starch is selected from the group consisting of waxy starches and root starches and the starch has been treated by a hypochlorite solution only at a pH between about 3.5 and about 5.0, wherein the available chlorine is about 0.08% to about 3.5% by weight starch to obtain a starch with a hot paste viscosity of about 4000 cps to about 6000 cps.

The thick-thin retort starch, whether etherified or not, is oxidized in a carefully controlled reaction and is not crosslinked or modified in any other way.

These and other aspects of the present invention may be more fully understood with reference to the following examples.

EXAMPLE 1

This example illustrates Brookfield viscosity measurements of the starch of the present invention before and after retort compared to other thick-thin starches. Table 1 below summarizes the results:

TABLE 1

| Starch Product | Pre-Retort (cps) | Post-Retort (cps) |
|---|---|---|
| 1. pH-controlled, oxidized waxy maize | 5450 | 85 |
| 2. pH-controlled, oxidized, hydroxypropylated waxy maize | 5200 | 25 |
| 3. Potato starch | 7240 | 334 |
| 4. Hydroxypropylated waxy maize | 1200 | 138 |
| 5. Waxy maize + erythorbic acid | 850 | 17 |
| 6. Modified waxy maize + erythorbic acid | 5100 | 22 |
| 7. Acetylated waxy maize | 3320 | 32 |

For each of the Brookfield viscosities reported in Table 1 above, a slurry was prepared with 5.5% by weight starch (d.b.) and 1.8% sodium chloride based on the weight of slurry. The slurries were rapidly heated on a steam bath to 95° C. and held there for 15 minutes while slowly stirred. Then the viscosity of the starch was measured and designated "Pre-Retort". Each paste was then placed in a sealed container and subjected to a retort by using an autoclave at 15 psi, 121° C. for one hour. The cans were allowed to cool overnight and the "Post-Retort" viscosities were measured at room temperature (25° C.). Viscosity was determined using a Brookfield RVF-100 viscometer at 20 rpm.

The pH-controlled oxidized waxy starch Product No. 1 was made by adding sodium hypochlorite solution to a slurry of waxy maize starch to provide a solution with 0.6% free chlorine by weight starch. The pH of the waxy slurry was adjusted to between 4 and 5. The pH adjustment was done before the addition of the hypochlorite solution and was monitored and adjusted throughout the reaction to maintain the appropriate pH. The oxidation lasted 5 hours while the temperature was maintained between 105° F. and 110° F.

The oxidized, hydroxypropylated waxy maize starch Product No. 2 was made in an identical manner to the oxidized waxy maize starch except the slurry formed was that of a hydroxypropylated waxy maize starch having a DS of 0.08.

The potato starch (Product No. 3) was a conventional, commercially available potato starch. The hydroxypropylated waxy maize starch was similar to that used to make Starch Product No. 2. Using propylene oxide, 2.6% by weight starch, in a conventional manner a slurry of waxy maize starch was converted to a hydroxypropylated waxy maize starch having a degree of substitution of 0.07. Starch Product Nos. 5 and 6 were commercial products. It is not known how Product No. 6 was modified nor how much erythorbic acid was present. Erythorbic acid is d-erythro-ascorbic acid (isoascorbic acid). Starch Product No. 7 was a commercial product and was reported to be an acetylated waxy maize. The acetyl level was unknown. Starch Product Nos. 5, 6 and 7 are commercial thick-thin retort starches.

EXAMPLE 2

This example illustrates the viscosity stability of the starch of the present invention prior to retort.

Pastes of Starch Product Nos. 2, 3, 6 and 7 of Example 1 were made from slurries of 5.5% by weight starch (d.b) with 1.8% sodium chloride added. The slurries were heated from 55° C. to 95° C. in 15 minutes at a rate of 1.5° C. per minute using a Brabender viscometer. Viscosities were measured in the Brabender with a 700 cmg cartridge. Table 2 below illustrates the results:

TABLE 2

| Time (min) | Viscosity of Starch Products (BU) | | | |
|---|---|---|---|---|
| | No. 2 | No. 3 | No. 6 | No. 7 |
| 0 | 0 | 0 | 0 | 0 |
| 5 | 60 | 5 | 0 | 0 |
| 10 | 785 | 790 | 0 | 320 |
| 15 | 740 | 1100 | 570 | 725 |
| 20 | 625 | 1350 | 620 | 580 |
| 25 | 550 | 1350 | 580 | 465 |
| 30 | 480 | 995 | 535 | 410 |
| 35 | 430 | 780 | 500 | 385 |
| 40 | 410 | 675 | 485 | 340 |

As can be seen from Table 2, the starch product of the present invention maintained its viscosity through an extended heating period while being subjected to shear from the viscometer.

EXAMPLE 3

This example illustrates the pH stability of the starch of the present invention prior to retort. Four starch samples of Starch Product No. 2 were prepared and the pH of each slurry adjusted with hydrochloric acid or sodium hydroxide to four different pH levels. The results are summarized in Table 3 below:

TABLE 3

| pH | Brabender Readings (BU) | | |
|---|---|---|---|
| | Peak | 95° C. Initial | 95° C., 15 min. Hold |
| 3.5 | 800 | 430 | 240 |
| 4.5 | 780 | 470 | 370 |
| 5.5 | 740 | 450 | 350 |
| 6.5 | 670 | 480 | 350 |

In order to test the pH stability of the starch of the present invention, aqueous slurries of 5.5% by weight starch (d.b.) were prepared and heated in a Brabender viscometer at a rate of 1.5° C. per minute from 55° C. to 95° C. using a 700 cmg cartridge. A sample of 460 grams was used for the tests. Once the temperature reached 95° C. the paste was held at that temperature for 15 minutes.

EXAMPLE 4

This example illustrates the effect of salt on the thick-thin starch of the present invention. Table 4 below reports the results and illustrates that the starch of the present invention is comparable to known thick-thin starches:

TABLE 4

| Starch Product | 0% NaCl Pre/Post Retort (cps) | 1.8% NaCl Pre/Post Retort (cps) |
|---|---|---|
| 2 | 4960/56 | 4500/32 |
| 3 | 8400/530 | 6700/335 |
| 6 | 6960/3350 | 7240/2860 |
| 7 | 6100/45 | 4900/90 |

As can be seen from Table 4 above, the thick-thin retort starch of the present invention works very well in both salt and no-salt environments. This is an important feature since the salt content of food may vary from high, especially condensed soup products, to no salt added products.

The procedure in Example 1 was followed for making and testing the starch except that two slurries for each starch were made, one with and one without sodium chloride, and an acid or base was added to each slurry to adjust the pH of the slurry to 5.5.

EXAMPLE 5

This example illustrates the freeze-thaw and clarity stability of the retorted starch of the present invention (Product No. 2) as compared to Starch Product Nos. 3, 6 and 7.

The procedure of Example 1 was followed for both preparing and retorting the starch products. After retort, the cans were opened, the contents were placed in test tubes and measured for turbidity, and then the test tubes were frozen (−30° C.). After 24 hours (one cycle) all tubes were removed from cold storage, allowed to come to room temperature (25° C.) and one tube was measured for turbidity. The remaining tubes were put back into cold storage.

The results from this test are reported in Table 5 below:

TABLE 5

| | Starch Products | | | |
|---|---|---|---|---|
| | 2 | 3 | 6 | 7 |
| Initial | 40 | 390 | 125 | 230 |
| Cycle 1 (24 hrs.) | 40 | 750 | 150 | 260 |
| Cycle 2 (48 hrs.) | 48 | 950 | 144 | 260 |
| Cycle 3 (72 hrs.) | 50 | off scale | 150 | 260 |
| Cycle 5 (96 hrs.) | 50 | — | 140 | 270 |
| Cycle 7 (120 hrs.) | 50 | — | 130 | 280 |
| Cycle 10 (192 hrs.) | 55 | — | 150 | 270 |

The values above are given in Nephelometric Turbidity Units (NTU); the lower the turbidity value, the clearer the paste clarity.

As can be seen, the thick-thin starch of the present invention was a clearer product than the other thick-thin starches and maintained its clarity throughout the tests. The stability in the turbidity numbers also illustrates the stability during the freeze-thaw process.

EXAMPLE 6

This example further illustrates the stability of the starch of the present invention to withstand shear forces which are normally encountered during food processing.

Table 6 below illustrates the shear stability of the starch of the present invention compared to other known starches and starch-based products:

TABLE 6

| Starch Product | 25s-1 | N(Dmax) | Shear Resistance | Shear Resilience |
|---|---|---|---|---|
| 2 | 585.48 | 322.89 | 55.15 | 105.56 |
| 3 | 893.10 | 421.63 | 47.18 | 103.23 |
| 4 | 625.17 | 295.41 | 47.25 | 104.85 |
| 6 | 654.96 | 311.44 | 47.55 | 105.56 |
| 7 | 466.40 | 258.77 | 55.48 | 119.18 |

Viscosity versus shear was measured for each sample using a Haake viscometer. Measurements were made at 60° C. on aqueous paste of 5.5% by weight starch (d.b.).

Each starch paste was subjected to a 3-minute hold of the paste in the cell to equilibrate temperature and then an acceleration to the maximum ($100s^{-1}$) over a period of 1 minute. A hold at the maximum shear rate for 1 minute followed, then a deceleration over 2 minutes to a stop. The measurement of viscosity at a shear of $25s^{-1}$ is recorded in Table 6 above. Also recorded is N(Dmax), the viscosity in centipoise observed at the maximum shear rate. Shear resistance is the ratio of the viscosity at the maximum shear rate to the viscosity at ½ the maximum shear rate on acceleration. Shear resilience is the ratio of the viscosity at half the maximum shear rate on acceleration to the viscosity at half the maximum shear rate on deceleration. It is a measure of the ability of the starch to recover any viscosity lost during the cycle.

EXAMPLE 7

This example illustrates the ability of the starch paste of the present invention to hold suspended foodstuffs.

Using a Carri-Med CS Rheometer, pastes of Starch Product Nos. 2, 3, 6 and 7 were tested. The compliance numbers at 0, 50, 100, 150, 200, 250 and 300 seconds as taken from a curve are reported in Table 7 below:

TABLE 7

| | Compliance Numbers ($10^{-2}$ cm$^2$/dynes) | | | |
| --- | --- | --- | --- | --- |
| | Starch Products | | | |
| Time (sec.) | 2 | 3 | 6 | 7 |
| 0 | 1 | 0.4 | 0.2 | 1.5 |
| 50 | 1.8 | 2.7 | 0.4 | 6.0 |
| 100 | 1.9 | 3.5 | 0.5 | 7.4 |
| 150 | 2.1 | 3.9 | 0.5 | 8.0 |
| 200 | 2.0 | 4.1 | 0.4 | 8.6 |
| 250 | 2.0 | 3.8 | 0.4 | 9.0 |
| 300 | 1.8 | 3.7 | 0.4 | 9.3 |

As can be seen from Table 7 above, the starch of the present invention is capable of maintaining the uniformity of a food mix.

The Carri-Med was operated in a standard manner. The cone had an angle of 20° and a diameter of 4.0 cm. The measurement system had a gap of 48.0 microns and a measurement system inertia of 63.60 dyne.cm.sec. The pastes were subjected to a constant stress of 40.0 dynes/cm$^2$ with a retardation time of 5 minutes and a relaxation time of 5 minutes. The pastes used for this example were 5.5% starch.

It will be understood that the claims are intended to cover all changes and modifications of the preferred embodiments of the invention herein chosen for the purpose of illustration which do not constitute a departure from the spirit and scope of the invention.

What is claimed is:

1. A thick-thin retort starch comprising an oxidized, non-crosslinked, substituted hydroxy alkylated starch ether wherein the starch ether is made from a base starch selected from the group consisting of waxy starches and root starches; the starch ether has a degree of substitution of up to about 0.93; and the starch ether is oxidized with a hypochlorite solution with about 0.08% to about 3.5% available chlorine by weight starch, at a pH of about 3.5 to about 5.0, to obtain a retort starch having a hot paste viscosity of about 4000 cps to about 6000 cps when measured with a Brookfield viscometer at 20 rpm.

2. The thick-thin retort starch of claim 1 wherein the base starch is a waxy maize.

3. The thick-thin retort starch of claim 1 wherein the starch ether is a hydroxypropylated starch ether with a degree of substitution of about 0.04 to about 0.13.

4. The thick-thin retort starch of claim 1 wherein the starch ether is oxidized with sodium hypochlorite at a pH of about 4 to about 5 and the available chlorine is about 0.1% to about 1.0% by weight starch.

5. A process for making a thick-thin retort starch comprising the steps of:
   (a) forming a slurry of base starch wherein the base starch is selected from the group consisting of waxy starches and root starches;
   (b) forming a hydroxy alkylated starch ether from the base starch wherein the hydroxy alkylated starch has a degree of substitution between about 0.04 and about 0.13; and
   (c) oxidizing said hydroxy alkylated starch with a hypochlorite solution at a pH of about 3.5 to about 5 and about 0.08% to about 3.5% available chlorine by weight starch to produce an oxidized hydroxy alkylated starch ether having a hot paste viscosity of about 4000 cps to 6000 cps.

6. The process of claim 5 wherein the step of oxidizing of said hydroxy alkylated starch comprises the steps of:
   (a) adjusting the pH of the hydroxy alkylated starch to about 3.5 to about 5.0;
   (b) adding a hypochlorite solution in an amount to provide about 0.1% to about 1.0% by weight starch; and
   (c) maintaining the pH at about 3.5 to about 5.0 throughout the oxidation step.

7. The process of claim 5 wherein the step of oxidizing said hydroxy alkylated starch comprises the steps of:
   (a) adding a hypochlorite solution to said hydroxy alkylated starch in an amount to provide about 0.1% to about 1.0% available chlorine by weight starch to form a mix; and
   (b) adjusting and maintaining the pH of the mix at about 3.5 to about 5.0.

8. The process of claim 5 wherein the base starch is a waxy maize.

9. The process of claim 5 wherein the hydroxy alkylated starch ether is a hydroxypropylated starch ether having a degree of substitution of about 0.06 to about 0.09.

10. The process of claim 5 wherein the oxidation step is conducted with sodium hypochlorite at a pH of about 4 to about 5 and added in an amount to provide about 0.2% to about 0.6% available chlorine by weight starch.

11. A thick-thin retort starch comprising an oxidized, non-substituted, non-crosslinked starch wherein the oxidized, non-substituted starch is made from a base starch selected from the group consisting of waxy starches and root starches and the starch is oxidized with a hypochlorite solution with about 0.08% to about 3.5% available chlorine by weight starch, at a pH of about 3.5 to about 5.0, to obtain a retort starch having a hot paste viscosity of about 4000 cps to about 6000 cps.

12. The thick-thin retort starch of claim 11 wherein the base starch is a waxy maize.

13. The thick-thin retort starch of claim 1 wherein the starch is oxidized with sodium hypochlorite at a pH of about 4 to about 5 and the available chlorine is about 0.2% to about 0.6% by weight starch.

14. In a retort food processing method wherein a uniform mix of foodstuff is used to fill a container prior to retort, the improvement comprising forming the uniform mix of foodstuff with a foodstuff and an effective amount of an oxidized, substituted hydroxy alkylated starch ether wherein the starch ether is made from a base starch selected from the group consisting of waxy starches and root starches; the starch ether has a degree of substitution of up to about 0.93; and the starch ether is oxidized with a hypochlorite solution with about 0.08% to 3.5% available chlorine by weight starch, at a pH of about 3.5 to about 5.0, to obtain a retort starch having a hot paste viscosity of about 4000 cps to about 6000 cps, said amount being effective to provide a thick viscosity to the uniform mix prior to retort and a thin viscosity during retort.

15. The method of claim 14 wherein the base starch is a waxy maize.

16. The method of claim 14 wherein the starch ether is a hydroxypropylated starch ether with a degree of substitution of about 0.06 to about 0.09.

17. The method of claim 14 wherein the starch ether is oxidized with sodium hypochlorite at a pH of about 4 to about 5 and the available chlorine is about 0.2% to about 0.6% by weight starch.

18. In a retort food processing method wherein a uniform mix of foodstuff is used to fill a container prior to retort, the improvement comprising forming the uniform mix of foodstuff with a foodstuff and an effective amount of an oxidized, non-substituted starch wherein the oxidized, non-substituted starch is made from a base starch selected from the group consisting of waxy starches and root starches and the base starch is oxidized with a hypochlorite solution with about 0.08% to about 3.5% available chlorine by weight starch, at a pH of about 3.5 to about 5.0, to obtain a retort starch having a hot paste viscosity of about 4000 cps to about 6000 cps, said amount being effective to provide a thick viscosity to the uniform mix prior to retort and a thin viscosity during retort.

19. The method of claim 18 wherein the base starch is a waxy maize.

20. The method of claim 18 wherein the starch is oxidized with sodium hypochlorite at a pH of about 4 to about 5 and the available chlorine is about 0.2% to about 0.6% by weight starch.

* * * * *

UNITED STATES PATENT AND TRADEMARK OFFICE
CERTIFICATE OF CORRECTION

PATENT NO. : 5,192,576
DATED : March 9, 1993
INVENTOR(S) : Shau-Gan Chang

It is certified that error appears in the above-identified patent and that said Letters Patent is hereby corrected as shown below:

Column 7, line 9, after "shear" insert --rate--.

Column 8, line 26 (claim 6), delete "of".

Signed and Sealed this

Twenty-third Day of November, 1993

Attest:

BRUCE LEHMAN

*Attesting Officer*   *Commissioner of Patents and Trademarks*